United States Patent

[11] 3,590,255

[72] Inventors Stanley B. Smith, Jr.
Lexington;
James E. Burnett, Maynard, both of, Mass.
[21] Appl. No. 803,211
[22] Filed Feb. 28, 1969
[45] Patented June 29, 1971
[73] Assignee Instrumentation Laboratory, Inc.
Lexington, Mass.

[54] ANALYSIS SYSTEM
20 Claims, 6 Drawing Figs.
[52] U.S. Cl.................................................. 250/218,
356/81, 356/88
[51] Int. Cl...................................................... G01n 21/26
[50] Field of Search........................................... 250/218;
356/81, 84, 88, 92, 93, 96, 97

[56] References Cited
UNITED STATES PATENTS
3,137,758 6/1964 Mason et al. ................. 356/81

3,415,998 12/1968 Crockett et al. ............... 356/97

Primary Examiner—James W. Lawrence
Assistant Examiner—Martin Abramson
Attorney—Willis M. Ertman ABSTRACT: An analysis system includes an analysis cell and a radiation source which generates a characteristic radiation. An optical system passes radiation from the source along a first path through the analysis cell for sensing by a sensor and passes radiation from the source along a second path outside of the analysis cell, for sensing by a second sensor. An optical modulator channels the radiation in each path alternately to the sensors so that each sensor alternately produces an output proportional to the radiation from the corresponding source in each path and means responsive to the optical modulator provides an accurately predetermined portion of the output signal from each sensor in each cycle of the optical modulator.

ANALYSIS SYSTEM

SUMMARY OF INVENTION

This invention relates to spectroanalytical systems and more particularly to atomic absorption and similar systems that employ an analysis cell.

In such analysis systems, it is essential to minimize sources of error or uncertainty. In an atomic absorption spectroanalytical system, for example, such sources of error or uncertainty arise from changes due for example to changes in power supply in the hollow cathode tube light sources; variations in the flame configuration in the analysis cell or the constituents of the supply to that flame; changes in the response of the sensors, for example, due to the photomultiplier power supply and aging of the photomultiplier tube. Accordingly it is an object of this invention to provide novel and improved instrumentation for use in high precision analytical systems.

Another object of this invention is to provide novel and improved spectroanalytical systems of the atomic absorption type.

A further object of the invention is to provide a novel and improved optical arrangement for use in a spectroanalytical system of the atomic absorption type.

Still another object of the invention is to provide improved electrical circuit arrangements responsive to an optical modulator employed in an analysis system so that outputs of improved accuracy and reliability are provided.

In accordance with a feature of the invention there is provided a spectroanalytical system in which two sources of radiation are employed. An optical system is provided for passing radiation from each source along a first path through the analysis cell and along a second path outside of the analysis cell. Two radiation sensors are provided and an optical modulator channels the radiation in each path alternately to the two radiation sensors. Circuitry responsive to the outputs of the two sensors establishes a signal ratio as a function of the effect of the analysis cell on the radiation from the two sensors to provide as an output a signal that is the ratio of the radiation in the two paths.

In a particular embodiment of the invention the optical modulator is a chopper that has an opaque sector 180° in angular extent which is disposed between the analysis cell and the sensors. The sector carries mirrors on two opposed surfaces and the sensors are arranged relative to the chopper and the light paths so that the chopper in one position reflects light from both paths to corresponding sensors and in a second position passes light from both paths to the sensors in inverse relation.

A further feature of the invention is the provision of circuit arrangements for selecting an accurately determined portion of the output of a sensor during each cycle of operation of the analysis system. The circuitry includes a sensor biased for linear operation which responds to two alternating conditions. The circuitry arrangement, which includes AC coupling of the electrical output signal of the sensor, provides a response to a predetermined portion of the transition between the two alternating conditions.

In a preferred embodiment, the circuitry responds to the optical modulator in an atomic absorption spectroanalysis system and includes a photosensitive field effect transistor which produces an output signal indicative of the cyclical operation of the optical modulator. This photosensor is biased for linear operation and its output is AC coupled to a transistor matched pair switching circuit biased so that the circuit switches at the average of the light and dark signals from the photosensor, thus providing compensation for changes in input light intensity. The output of the switching circuit is employed to open a gating window for the video signals from the two photosensors, each responding alternately to radiation through the analysis cell and radiation bypassing the analysis cell, to produce video output signals of accurately predetermined time duration, which outputs are demodulated and then employed to generate the ratio signal.

Other objects, features and advantages of the invention will be seen as the following description of a particular embodiment progresses. Other embodiments of the invention will be apparent to those skilled in the art. In the drawings.

DESCRIPTION OF PARTICULAR EMBODIMENT

Figure 1:
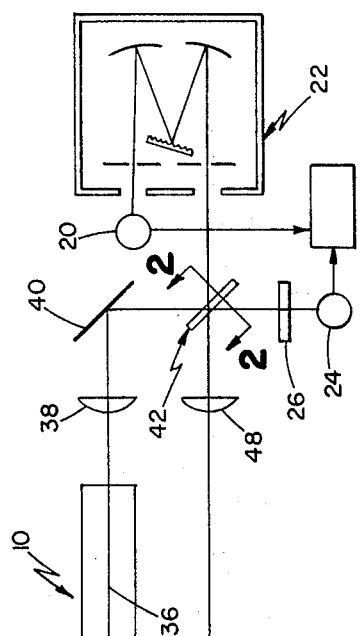
FIG. 1 is a schematic diagram of an atomic absorption spectroanalysis instrument constructed in accordance with the invention.

With reference to FIG. 1 there is shown an atomic absorption system employing an analysis cell in the form of a flame from burner 10. Two radiation sources 12, 14 are employed and in this particular embodiment those sources are hollow cathode tubes of the type conventionally employed in atomic absorption instruments. Each hollow cathode tube emits a specific wave length of light related to an element of significance in the flame at burner 10. For example, hollow cathode tube 12 may emit a wave length associated with calcium while hollow cathode tube 14 may emit a wave length associated with strontium. Source 12 is pulsed at a first frequency, for example 500 Hz. and source 14 is pulsed at a second frequency for example 1,000 Hz.

The system, in addition, includes radiation sensor 20 of the photomultiplier type associated with grating monochromator unit 22 set to respond to the wave length output of source 12; and radiation sensor 24 of the photodiode type with which is associated filter 26 that passes only the wave length output of source 14. A first portion of the output beam 30 from tube 12 passes through a quartz beam splitter 32 and is focused by spherical quartz lens 34 for passage through the flame from burner 10 so that the image of the aperture of tube 12 is located at the center of the flame at point 36. In this embodiment the aperture of tube 12 is located 160 millimeters from lens 34 and the image 36 is located 90 millimeters from lens 34. A second lens 38 focuses the beam of light that passes through the flame as reflected by front surface mirror 40 for impingement on a first surface of rotating optical modulator 42 and passage to the two monochrometers. This modulator alternately directs light from mirror 40 to the grating monochrometer 22 for sensing by photomultiplier tube 20 and to the monochrometer of filter 26 and diode 24. A second portion of the output beam 30 is reflected by beam splitter 32 for reflection by mirror 44 and focusing by lenses 46, 48 for impingement on a second surface of modulator 42. The modulator, in similar fashion, alternately directs light from lens 48 to photomultiplier 20 or to photodiode 24.

The beam 49 of radiation from hollow cathode tube 14 impinges on beam splitter 32 and is similarly divided, a first portion passing through the absorbing cell 10 and the second portion passing through lenses 46 and 48 (bypassing the absorbing cell). The two portions impinge on and are channeled alternately by modulator 42 to photomultiplier 20 and photodiode 24.

Figure 2:
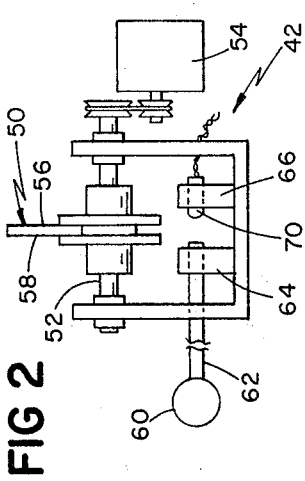
FIG. 2 is a side view of the chopper arrangement employed in the instrument shown in FIG. 1.

A sectional view of the optical modulator 42 is shown in FIG. 2. That modulator includes a chopper plate 50 of 180° angular extent that is mounted on shaft 52 and driven in rotation by motor 54. The chopper plate 50 has two opposed mirror surfaces 56, 58. Light from source 60 is directed by fiber optic coupling 62 (a light beam width of about 2 millimeters), across gap between spaced supports 64, 66 for sensing by photo field effect transistor 70 mounted on support 66. The width of each light beam impinging on sensors 20 and 24, as shopped by blade 50, is about 2 centimeters.

Figure 3:
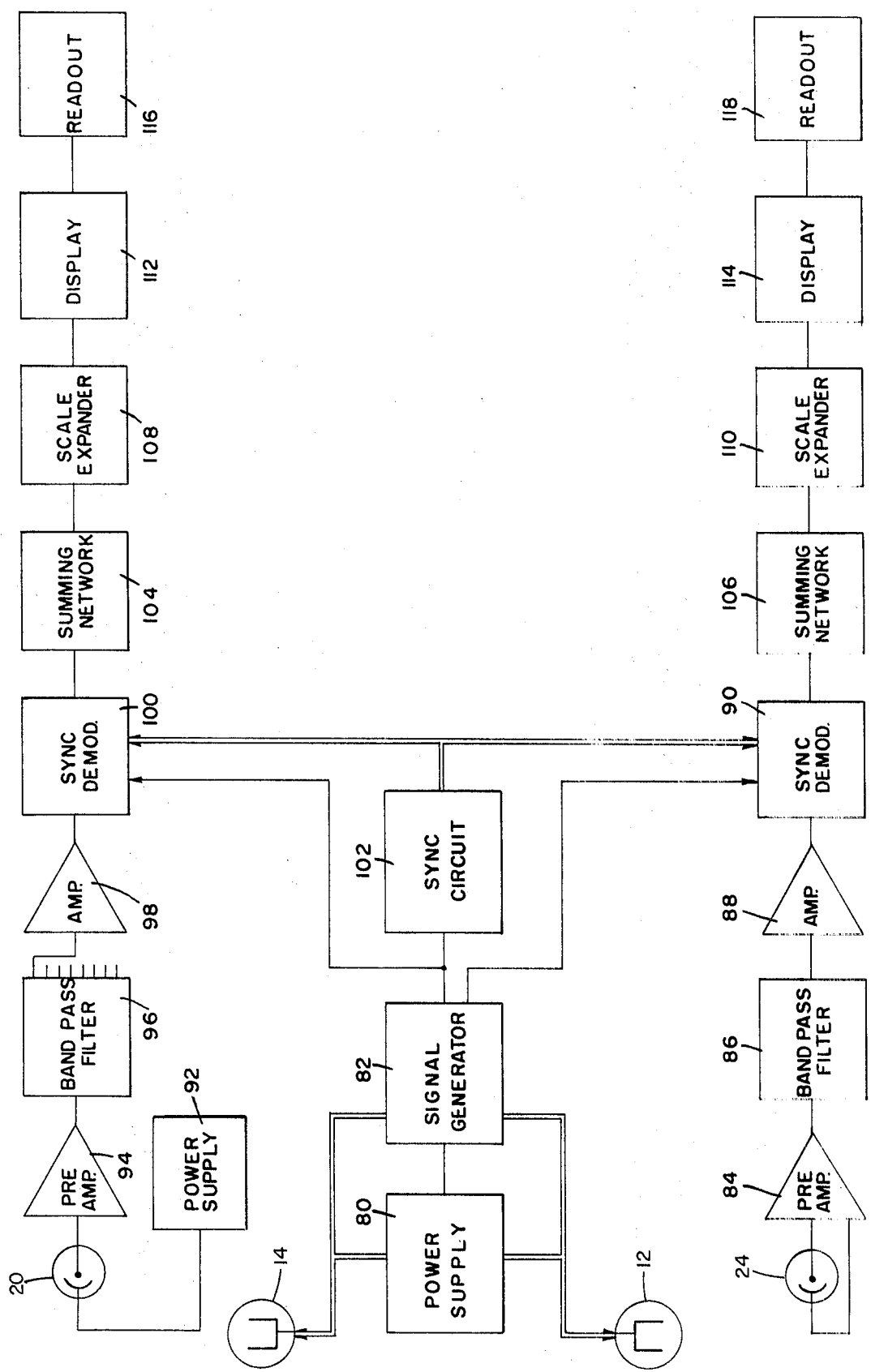
FIG. 3 is a schematic block diagram showing electrical circuit arrangements employed in the instrument shown in FIG. 1.

With reference to FIG. 3, each hollow cathode tube 12, 14 is energized by power supply 80 and is pulsed by signals from square wave signal generator 82, hollow cathode tube 12 being pulsed at a frequency of 500 Hz. and hollow cathode tube 14 being pulsed at a frequency of 1,000 Hz.

Channel A (coupled to photomultiplier tube 20) is similar to channel B (coupled to photodiode tube 24). The output of photodiode 24 is applied through a preamplifier circuit 84 and a five hundred cycle band pass filter 86 whose pass band is centered at 1,000 Hz. and an amplifier 88 for application to current mode synchronous demodulator 90. Photomultiplier tube 20 has a power supply 92 coupled to it and its output is applied through a preamplifier 94 and a five hundred cycle band pass filter 96 whose pass band is centered at 500 Hz. and an AC amplifier 98 for application to current mode synchronous demodulator 100, identical with demodulator 90. Both demodulators also have inputs from the square wave generator 82 and a chopper synchronizing circuit 102 and each includes logarithmic amplifier circuitry which generates log I and log $I_o$ signals in a manner similar to the circuitry described in copending application Ser. No. 652,976, filed July 12, 1967 and assigned to the same assignee as this application.

The output of the log amplifiers in each synchronous demodulator unit is applied to a summing network 104, 106, respectively, which provide, as an output, a log $I/I_o$ signal. Those signals are coupled to scale expander circuits 108, 110, respectively. The outputs of those circuits are in turn applied to display circuits 112, 114 and their outputs in turn are applied to suitable readout circuits 116, 118, such as display counters. A ganged channel selector switch (not shown) has a first position for independent operation of both channels, a second position for operation of only the channel associated with the photomultiplier tube 20, and a third position which provides a ratio of the two channels.

Figure 4:
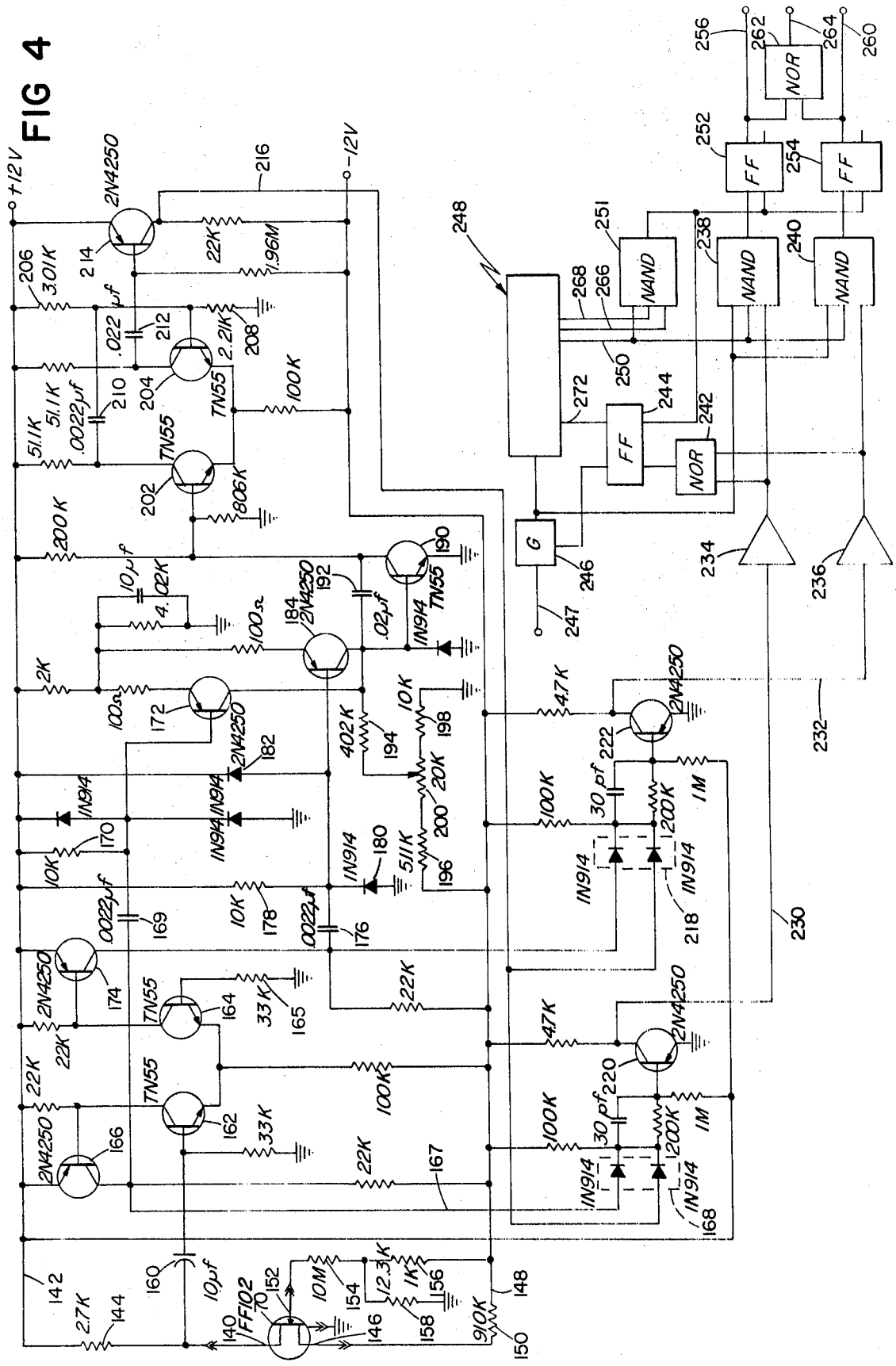
FIG. 4 is a schematic diagram of the phototransistor timing and digital logic employed in the instrument shown in FIG. 1.

Additional details of the chopper synchronizing circuit 102 may be had with reference to FIG. 4. In that FIG. the photo FET 70 has its drain electrode 140 connected to +12 volt bus 142 via resistor 144; its source electrode 146 connected to −12 volt bus 148 through resistor 150; and its gate electrode 152 also connected to bus 148 through resistors 154, 156 and to ground through resistors 156, 158. The resistor network of resistors 150, 156, and 158 bias transistor 70 for linear operation response as a function of incident light intensity. The AC signal from drain electrode 140 is coupled by capacitor 160 to a pair of transistors 162, 164 which are matched for equal $V_{be}$ ±2 mv. at 10 microamperes. The base of transistor 164 is grounded via resistor 165 and the conduction of the two transistors are switched with respect to that reference ground as a function of the AC transition at the base of transistor 162 as coupled by capacitor 160 from photo FET 70. In this embodiment, the circuit responds to the light and dark intensity outputs of the optical modulator FET and switches at one half the difference of those two intensity values. Such transition occurs twice in each cycle of optical modulator 42, once at the leading edge of sector 50 and then at the trailing edge of that sector. The switching point of transistor pair 162, 164 may be varied by changing the reference potential of the base of transistor 164.

Amplifier inverter transistor 166 coupled to the collector of transistor 162 provides an output over the line 167 to one input of AND gate 168 and through the differentiating circuit of capacitor 169 and resistor 170 to driver transistor 172.

The collector of transistor 164 is connected to the base of inverter transistor 174 which is similarly connected to a differentiating circuit which includes capacitor 176 and resistor 178 and similar protective diodes 180, 182. The output of differentiating circuit is applied to a second current driver transistor 184. The collectors of transistors 172, 184 are connected to a Miller time delay network including transistor 190, capacitor 192, and the ramp control network of resistors 194, 196, 198 and potentiometer 200. The current spike from either transistor 172 or 184 turns on transistor 190 and the RC time constant of the linear ramp circuit of capacitor 192 and the resistor network (adjustable by potentiometer 200) determines the turn off time of transistor 190. When transistor 190 turns on, it causes transistor 202 to conduct and turn off transistor 204 of a matched pair similar to transistor pair 162, 164. The switching point of this transistor pair is determined by the voltage divider network of resistors 206, 208. Capacitor 210 provides positive feedback and increases the switching rate. When transistor 204 turns on, the current spike transition is coupled by capacitor 212 to turn off transistor 214 which is normally biased on and provides an output of 12 milliseconds duration on line 216 as a gating output provides a conditioning input to AND circuits 168 and 218. Depending on which inverter transistor 166, 174 is conducting, either transistor 220 or transistor 222 is switched into conduction; transistor 220 providing a channel A I (channel B $I_o$) signal over line 230 and transistor 222 providing a channel A $I_o$ (channel B I) signal over line 232.

These signals are applied through inverters 234, 236, respectively for application to NAND circuits 238, 240, respectively. The outputs are also applied through NOR circuit 242 to set gating flip-flop 244. The set output of that flip-flop conditions gate 246 to which are applied (over line 247) pulses at a 500 Hz. rate from clock 82. When gate 246 is conditioned pulses are applied to four stage flip-flop counter 248. Setting of the second stage of counter 248 provides a conditioning output on line 250 for application to all three NAND circuits 238, 240, 251. The next pulse transition on line 247 is passed by gate 246 and by the fully conditioned NAND circuit 238 or 240 which in turn sets the corresponding flip-flop 252, 254. Flip-flop 252 provides a gating output over line 256 and flip-flop 254 provides a gating output over line 260 for application to synchronous demodulators 90, 100. (In its set condition flip-flop 254 provides a gating output for Beer's Law compensation to the respective demodulators 90 and 100.) The outputs on lines 256 and 260 are applied through NOR circuit 262 whose output is applied over line 264 as a shunt gate input. When counter 248 has both its third and fourth stages set (indicated by signals on lines 266 and 268) NAND circuit 270 is fully conditioned and the setting of its second stage produces an output to clear flip-flop 244 and the flip-flop 252 or 254 that is set, thus terminating the sampling cycle. The clearing of flip-flop 244 provides a signal over line 272 to clear the four stages of counter 248.

Figure 5:
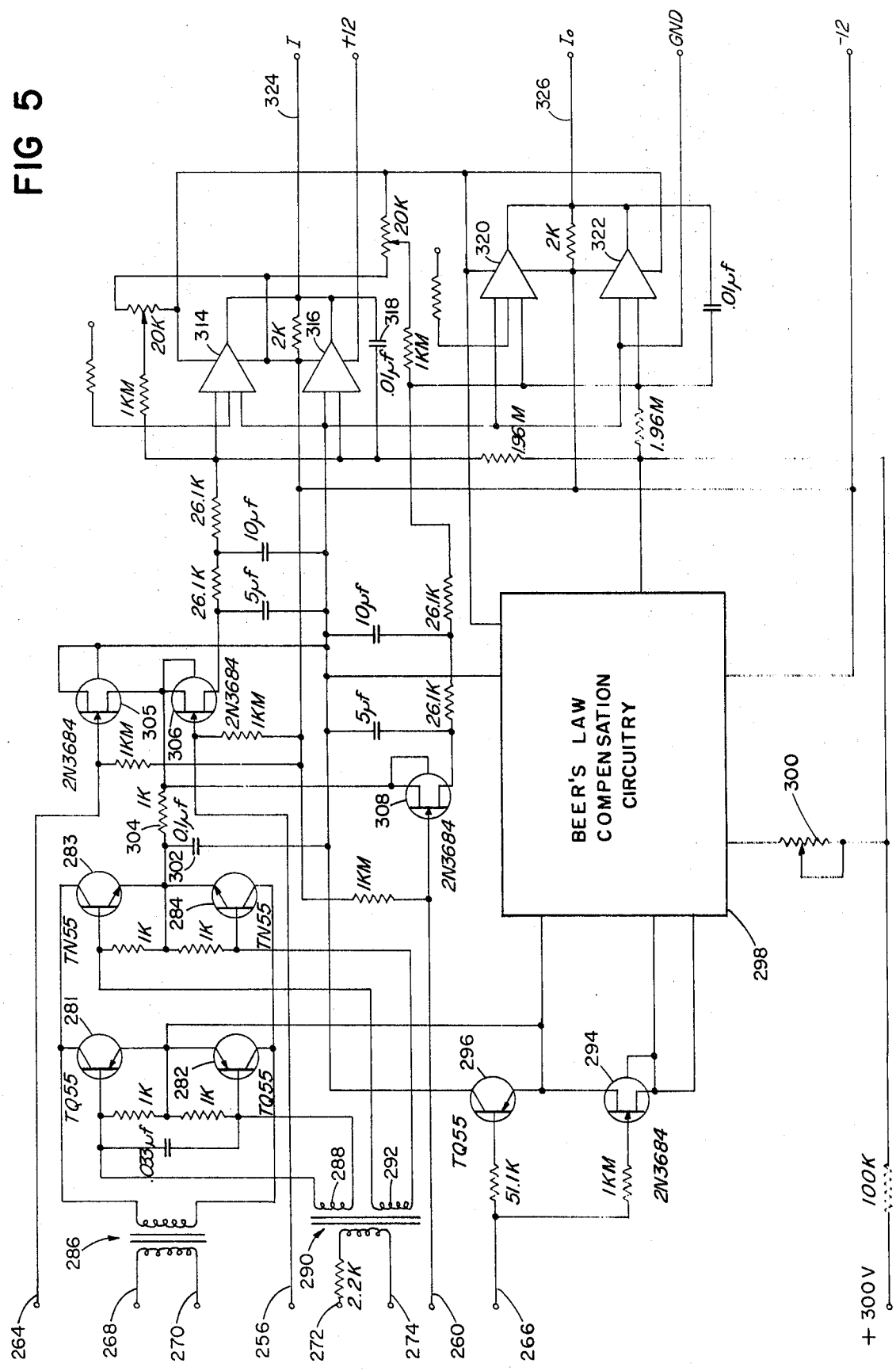
FIG. 5 is a schematic diagram of the synchronous demodulator-log amplifier circuitry employed in the instrument shown in FIG. 1.

A schematic circuit of the synchronous demodulator-log amplifier unit 100 of channel A is shown in FIG. 5. The I gate signal is applied on line 256, the $I_o$ gate signal on line 260, the shunt gate signal on line 264, the Beer's law gate signal on line 266; the signal from the high impedance current source 98 on lines 268, 270; and the demodulator drive signal on lines 272, 274. The demodulator circuit includes four switching transistors 281—284 arranged in a bridge circuit. Transistors 281 and 282 are PNP while transistors 283 and 284 are NPN. The resulting base collector diode arrangements are such that deleterious reverse currents from both the output terminal (junction of emitters of transistors 283 and 284) and the grounding terminal (junction of emitters of transistors 281 and 282) are blocked. Thus the dynamic range of the output of the demodulator is extended. The signal input on lines 268, 270 is coupled by transformer 286 to the collector electrodes of transistors 281—284; and the demodulator drive signal from signal generator 82 is coupled by the secondary winding 288 of transformer 290 to the base electrodes of transistors 281 and 282; and by secondary winding 292 to the base electrodes of transistors 283 and 284. The emitters of transistors 281 and 282 is connected to the drain electrode of FET 294 (at virtual ground) which is also coupled to switching transistor 296 whose base is connected to Beer's law gate signal on line 266. FET 294 is connected to operational amplifier circuitry in the Beer's law compensation circuit 298 which provides compensation in accordance with the setting of compensation resistor 300.

The demodulated output of transistors 283 and 284 is applied through the filter network of capacitor 302 and resistor 304 to the source electrodes of FET switches 306, 309. The I gate signal on line 256 is applied to the gate electrode of FET 306 and the $I_o$ gate signal is applied to the gate electrode of FET 308. Connected between the drain electrode of each FET 306, 308 and a log amplifier circuit is an RC filter 310, 312, respectively. The I log amplifier includes operational amplifier 314 and function generator operational amplifier 316 which has capacitor 318 connected in its feedback loop; while the $I_o$ log amplifier has similar operational amplifier circuits 320, 322. A log I signal is supplied on line 324 and a log $I_o$ signal is supplied on line 326. These signals are subtracted in summing amplifier 104 to provide the channel A log $I_{o/I}$ signal which in turn is manipulated by scale expander circuit 108, and servo circuit 112 for display on readout device 116.

Figure 6:
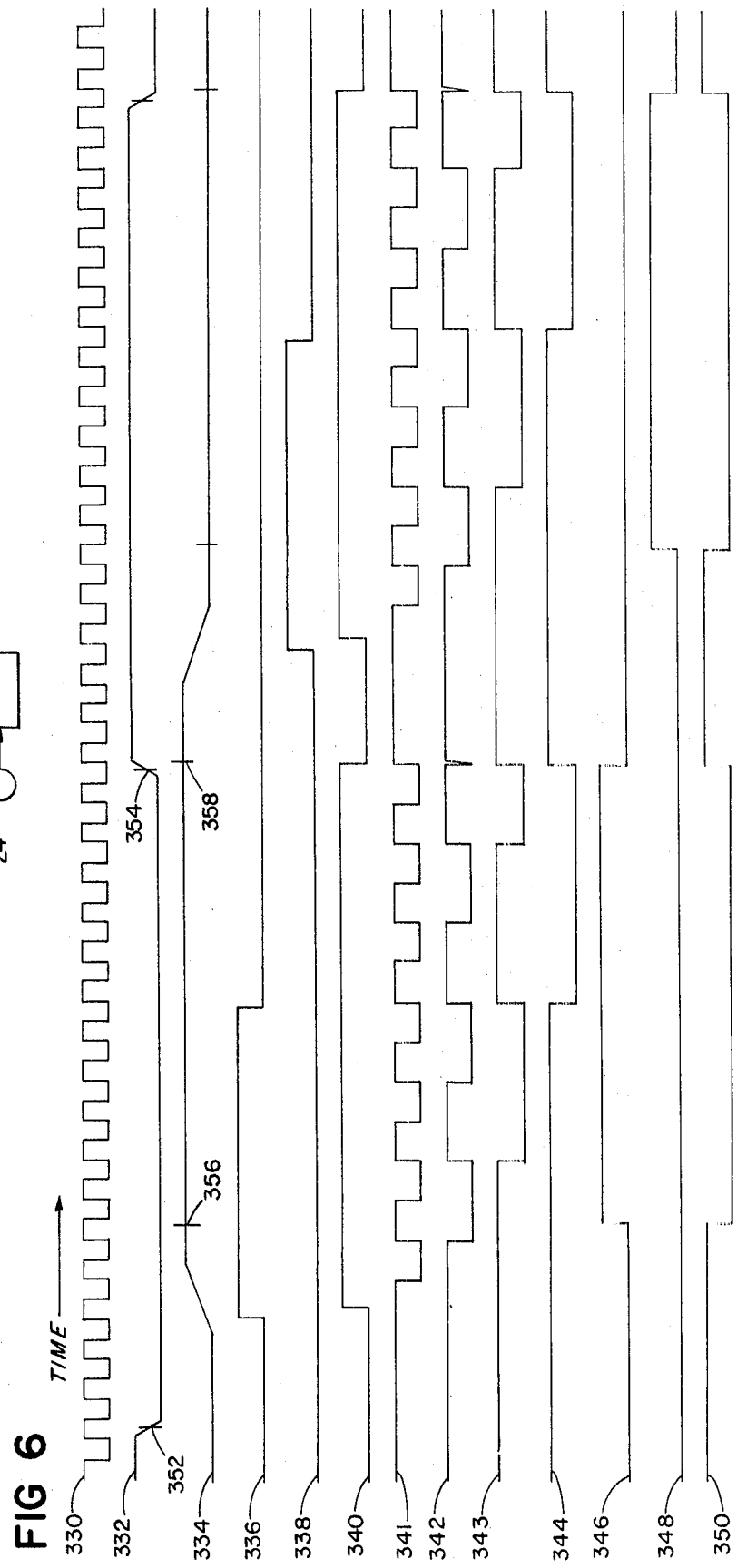
FIG. 6 is a timing diagram indicating a mode of operation of the instrument shown in FIG. 1.

With reference to the timing diagram shown in FIG. 6, the 500 Hz. clock pulse 330 is generated continuously. Curve 332 represents the signal output of the photofield effect transistor 70 as chopped by modulator 42. Curve 334 represents the video envelope produced by the photomultiplier tube 20. The envelopes 332 and 334 are appropriately offset in time from one another by location of FET 70 for desired timing. Curves 336 and 338 are the I and $I_o$ gating outputs on lines 230 and 232, respectively, from the chopper synchronizing circuit. Curve 340 indicates the setting of gating flip-flop 244 (FIG. 4), that flip-flop being set by either gate I signal or the gate $I_o$ signal and cleared by each output from NAND circuit 251; and the next four lines (341-344) indicate settings of the four flip-flops in counter 248. Curve 346 indicates the output of flip-flop 252 (Line 256); curve 348 indicates the output of flip-flop 254 (line 260); and curve 350 indicates the output on line 264 of NOR circuit 262.

The operation of modulator 42 is not synchronized with the clockpulse source, as indicated in FIG. 6. From the timing diagram it will be seen that each sampling period is initiated at the 50 percent transition (point 352 on curve 332 in the negative going transition and point 354 in the positive going transition). The matched pair of transistors 162, 164 (FIG. 4) is triggered at those points and the circuitry produces gating levels on lines 230 and 232 alternately (curves 336 and 338). Each gating level (delayed only by the delays of amplifier 234 (or 236) and NOR circuit 242) sets flip-flop 244 (cure 340). Counter 248 (curves 341—344) is then stepped by the clock pulses 330. The clock pulse following the setting of the second counter flip-flop (curve 342) produces an output from the conditioned NAND circuit 238 or 240 which sets the corresponding flip-flop 252 or 254 to produce a gating level (curve 346 or 348) for application to the demodulators 90 and 100. As the second counter flip-flop is set (curve 342) after the third and fourth flip flops are set (curves 343 and 344) NAND circuit 251 produces an output to reset the set output flip-flop 252 or 254 and terminate that gating level (curve 346 or 348).

Thus a precisely determined gating interval of the video signal (between points 356 and 358 on curve 334) independent of irregularities in the speed of the rotation of the chopper disc 50 is produced. The video signal is demodulated during this interval for filtering and log conversion. The invention thus provides I and $I_o$ output signals with great precision with respect to the relative duty cycles of the two signals. Errors due to changes in the absolute value of the duty cycles are cancelled.

It is obvious that the invention and particular aspects of the disclosed embodiment are applicable to systems other than atomic absorption spectroanalysis systems and therefore it is not intended that the invention be limited to the disclosed embodiment or to details thereof and departures may be made therefrom within the spirit and scope of the invention as defined in the claims.

What we claim is:
1. A spectoranalysis system comprising an analysis cell, two radiation sources, each said source generating a characteristic radiation, two radiation sensors, an optical system for passing radiation from each source along a first path through said analysis cell for sensing by said sensors and passing radiation from each source along a second path outside of said analysis cell for sensing by each of said sensors, an optical modulator for channeling radiation energy from said sources in each of said first and second paths alternately to said sensors so that each sensor alternately produces an output proportional to the radiation from the corresponding source in each said first and second paths, means responsive to said optical modulator for providing and accurately predetermined portion of the output signal from each sensor in each cycle of said optical modulator and circuitry responsive to the outputs of said sensors for establishing a signal ratio as a function of the effect of said analysis cell on the radiation from said radiation sources.

2. The system as claimed in claim 1 wherein said optical modulator is a rotatable chopper device disposed between said cell and said sensors, said chopper device including two opposed reflecting surfaces for concurrently reflecting radiation in said first and second paths to said sensors in a first position of said chopper device, the radiation in said first and second paths passing directly to opposite sensors in a second position of said chopper device.

3. The system as claimed in claim 1 wherein said optical modulator is disposed between said cell and said sensors.

4. The system as claimed in claim 1 wherein said circuitry includes a source of clock pulses, a counter responsive to said clock pulses and said optical modulator responsive means, and circuitry responsive to said counter for gating the output signals from said sensors during a time interval corresponding to a predetermined number of clock pulses during each cycle of said modulator.

5 The analysis system as claimed in claim 1 wherein said optical modulator is a rotatable chopper device that includes an opaque chopping member and said optical modulator responsive means includes a light source and a light sensor, said light source being disposed on one side of the path of said chopping member and said light sensor being disposed on the other side of said chopping member opposite said light source.

6. The analysis system as claimed in claim 5 wherein said optical modulator responsive means further includes means for biasing said light sensor for linear operation, a switching circuit arranged for switching at a predetermined point in each transition in the output of said light sensor produced by said modulator and capacitive coupling between said light sensor and said switching circuit for coupling the AC component of the output of said light sensor to said switching circuit.

7. The analysis system as claimed in claim 6 wherein said light sensor is a photosensitive field effect transistor and said switching circuit includes a matched pair of transistors connected in differential arrangement.

8. The analysis system as claimed in claim 1 and further including pulse source means for pulsing each said radiation source at a unique rate and wherein said sensor output responsive circuitry includes a filter network having a pass band corresponding to the pulsed rate of its associated radiation source.

9. The analysis system as claimed in claim 8 wherein said sensor output responsive means includes demodulation circuitry responsive to the output of said filter network and to said pulse source means.

10. The analysis system as claimed in claim 9 wherein said demodulation circuitry comprises four solid state switching devices arranged in bridge configuration, each switching device of a first pair being of NPN configuration and each switching device of the second pair being of PNP configuration, the output circuits of one pair of switching devices being connected to a reference terminal and the output circuits of the other pair of switching devices being connected to the output terminal of the demodulation circuitry.

11. The analysis system as claimed in claim 9 wherein said modulator responsive means includes gating means responsive to said pulse source means for providing a gating interval to pass an accurately predetermined portion of the output of said demodulation circuitry in each cycle of said modulator for establishing said signal ratio.

12. The system as claimed in claim 11 wherein said gating means includes a source of clock pulses, a counter responsive to said clock pulses and said optical modulator responsive, means, and circuitry responsive to said counter for gating the output signals from said sensors during a time interval corresponding to a predetermined number of clock pulses during each cycle of said modulator.

13. The analysis system as claimed in claim 12 wherein said gating circuitry includes a light source and a light sensor, said light source being disposed on one side of said modulator and said light sensor being disposed on the other side of said modulator opposite said light source.

14. The analysis system as claimed in claim 12 wherein said gating circuitry further includes a modulator sensor means for biasing said modulator sensor for linear operation, a switching circuit arranged for switching at a predetermined point in each transition in the output of said modulator sensor produced by said modulator and capacitive coupling between said modulator sensor and said switching circuit for the AC component of the output of said modulator sensor to said switching circuit.

15. The analysis system as claimed in claim 14 wherein said modulator sensor is a photosensitive field effect transistor and said switching circuit includes a matched pair of transistors connected in differential arrangement.

16. A synchronous demodulator circuit comprising four solid state switching devices arranged in bridge configuration, each switching device of a first pair being of NPN configuration and each switching device of the second pair being of PNP configuration, the output circuits of one pair of switching devices being connected to a reference terminal and the output circuits of the other pair of switching devices being connected to the demodulator output terminal.

17. In an analysis system which includes an optical modulator for periodically channeling radiation to a radiation sensor which radiation sensor produces an electrical output as a function of the radiation impinging on said sensor, control circuitry including a modulator sensor for producing an output in synchronism with the cyclical modulation of radiation to said radiation sensor, a source of clock pulses, a counter responsive to said clock pulses and to the output of said modulator sensor, and circuitry responsive to said counter for gating the output signal from said radiation sensor during a time interval corresponding to a predetermined number of clock pulses during each cycle of said modulator.

18. The analysis system as claimed in claim 17 and further including means for biasing said modulator sensor for linear operation, a switching circuit arranged for switching at a predetermined point in each transition in the output of said modulator sensor produced by said modulator, and capacitive coupling between said modulator sensor and said switching circuit for coupling the AC component of the output of said modulator sensor to said switching circuit.

19. The analysis system as claimed in claim 18 wherein said modulator sensor is a photosensitive field effect transistor and said switching circuit includes a matched pair of transistors connected in differential arrangement.

20. In an analysis system which includes an optical modulator for periodically channeling radiation to a radiation sensor which radiation sensor produces an electrical output as a function of the radiation impinging on said sensor, control circuitry including a modulator sensor for producing an output in synchronism with the cyclical modulation of radiation to said radiation sensor, means for biasing said light sensor for linear operation, a switching circuit arranged for switching at a predetermined point in each transition in the output of said light sensor produced by said modulator and capacitive coupling between said light sensor and said switching circuit for coupling the AC component of the output of said light sensor to said switching circuit, and circuitry responsive to the output of said modulator sensor for gating the output signal from said radiation sensor at a rate corresponding to the cyclical operation of said optical modulator.